United States Patent

Bianchi

Patent Number: 5,165,335
Date of Patent: Nov. 24, 1992

[54] CROSS-RIBBED GARLIC PRESS

[76] Inventor: Stephan Bianchi, 1353 Todd St., Mountain View, Calif. 94040-2929

[21] Appl. No.: 762,616

[22] Filed: Sep. 19, 1991

[51] Int. Cl.⁵ ................................................ B30B 9/06
[52] U.S. Cl. ........................................ 100/112; D7/666; 15/236.08; 99/495; 100/116; 100/125; 100/234
[58] Field of Search .............. 100/104, 110, 112, 113, 100/116, 125, 234, 243, 295, 102; 15/105, 246, 236.05, 236.08; 210/413, 465; D7/666; 99/495

[56] References Cited

U.S. PATENT DOCUMENTS

| | | | |
|---|---|---|---|
| 216,699 | 6/1879 | Reynolds | 100/234 X |
| 240,858 | 5/1881 | Steber | 100/234 X |
| 280,257 | 6/1883 | Stein et al. | 100/234 X |
| 386,694 | 7/1888 | Edie | 100/234 X |
| 441,419 | 11/1890 | Jones | 210/413 X |
| 581,526 | 4/1897 | Straube | 100/234 X |
| 620,047 | 2/1899 | Neal | 100/125 X |
| 628,470 | 7/1899 | James | 100/234 |
| 694,617 | 3/1902 | Coomber | 100/234 X |
| 726,075 | 4/1903 | Kress | 100/234 X |
| 782,406 | 2/1905 | Mayhew et al. | 100/234 X |
| 980,466 | 1/1911 | Williams | 100/116 X |
| D. 293,757 | 1/1988 | Pedrini | D7/666 |
| 1,399,708 | 12/1921 | Ferdon | 100/234 X |
| 1,457,478 | 6/1923 | Williams et al. | 100/234 X |
| 1,938,463 | 12/1933 | Roberts | 100/125 X |
| 1,939,307 | 12/1933 | Majewski | D7/666 |
| 2,220,458 | 11/1940 | Osterman | 100/125 X |
| 2,776,616 | 1/1957 | Sarossy | 100/125 X |
| 3,327,621 | 6/1967 | Zysset | 100/125 |
| 4,069,752 | 1/1978 | Ahner | 100/112 |
| 4,389,315 | 6/1983 | Crocket | 210/413 X |
| 4,466,346 | 8/1984 | Gemelli | 100/112 |
| 4,531,457 | 7/1985 | Sivaslian | 100/234 X |
| 4,545,299 | 10/1985 | Ahner | 100/112 |

FOREIGN PATENT DOCUMENTS

| | | | |
|---|---|---|---|
| 919968 | 11/1954 | Fed. Rep. of Germany | 100/234 |
| 831225 | 8/1938 | France | 100/125 |
| 1093394 | 5/1955 | France | 100/234 |
| 1200644 | 12/1959 | France | 100/234 |
| 313348 | 5/1956 | Switzerland | 100/234 |
| 10096 | of 1884 | United Kingdom | 100/113 |

*Primary Examiner*—Harvey C. Hornsby
*Assistant Examiner*—Stephen F. Gerrity

[57] ABSTRACT

A simple, easily cleaned press having a grate (28) in which perforations (34) are created by inside and outside grooves (30 and 32) running at angles to each other. A ram wall (36) is provided with ridges (38) which mate with the inside grooves of the grate. These grooves and ridges can be cleaned by scraping or wiping comb teeth (40 and 42) along them. The comb teeth protrude from the far ends of the two levers (16 and 14): one attached to the ram (12), the other attached to the cup (10). The two parts are joined by a detachable hinge (18 and 24), allowing the comb of one part to be engaged with the corrugations of the other.

6 Claims, 1 Drawing Sheet

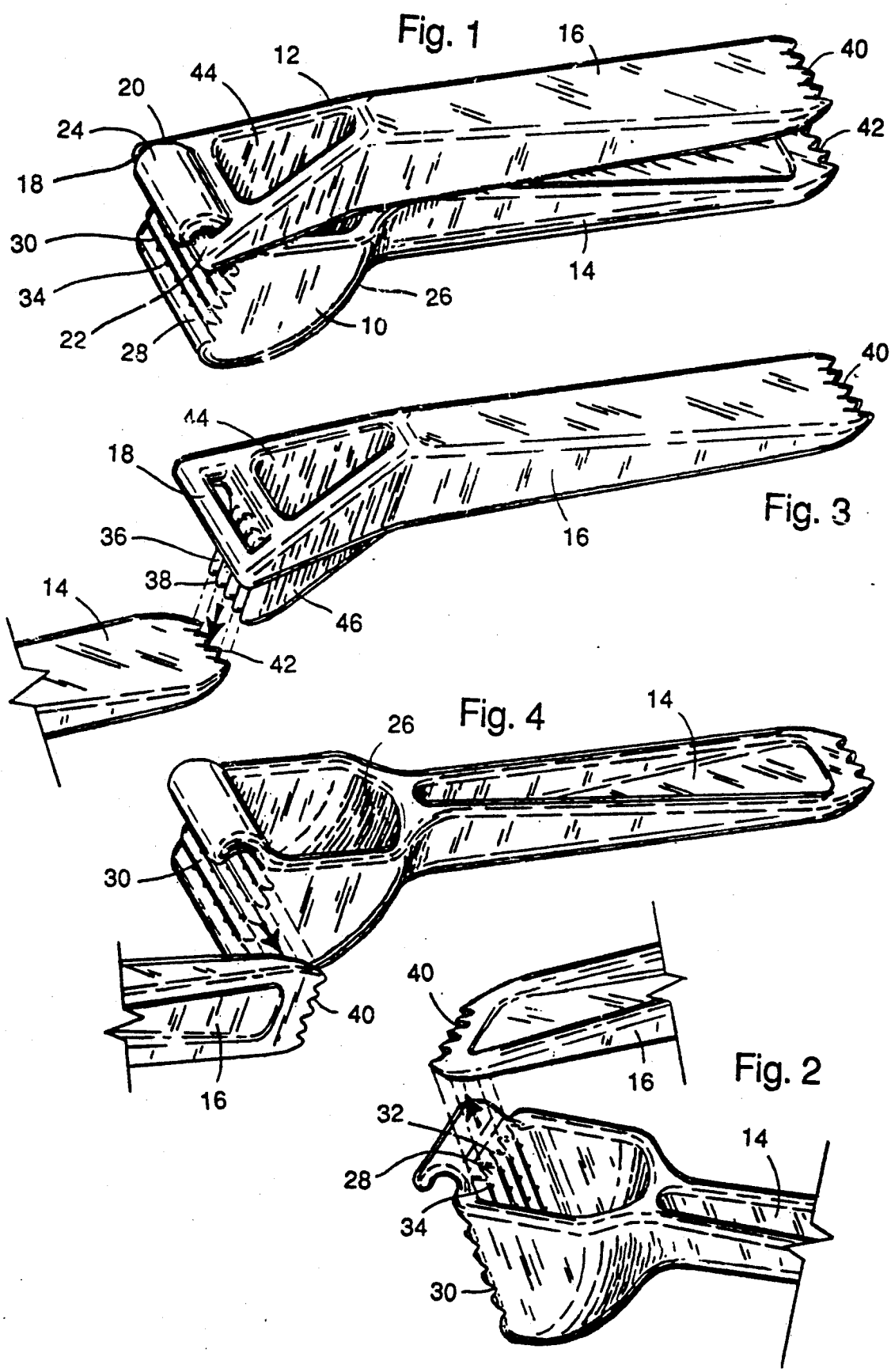

CROSS-RIBBED GARLIC PRESS

BACKGROUND

1. Field of Invention

This invention relates to food processing, specifically to a grate incorporated into presses used to shred and extract juice from garlic and the like.

2. Prior Art

Freshly crushed garlic is frequently required in recipes. Generally, the garlic to be crushed is placed into a press comprising a cup or receiver having a wall with a perforated surface so as to provide a grate or sieve. A ram or piston is forced into the cup, compressing the garlic so that its juice separates from its cells and flows out through the holes in the grate or sieve.

Heretofore, such presses generally have had corners and crevices which retain sticky, fibrous residue from the crushed garlic. In particular, the grate through which the juice is pressed is difficult to clean because of the grate's location at the bottom of a cup and the intricacy inherent in its large numbers of cylindrical holes.

The difficulty of cleaning garlic presses is attested to by the appearance on the market of garlic of presses advertised to be "self-cleaning". Such presses are generally provided with combs, which, when inserted into the grate, serve to dislodge residue. These accessories have further increased the cost and complexity of the device and are nearly as hard to clean as the grates themselves had been. The poking action dictated by the configuration of these combs is quite inefficient. Insertion of the combs generally fails to force the residue completely through the holes, and withdrawal of the combs tends to draw some of it back into the holes. Also, some of these combs are separate and hence easy to lose.

OBJECTS AND ADVANTAGES

Accordingly, several objects and advantages of my invention are to provide a garlic press with a grate which makes it easier to clean than others claimed to be self-cleaning. Like many other presses, this is equipped with cleaning combs, but in this design, the combs are to be employed in a wiping, rather than a less efficient poking, action. These simple combs are integrated into the two parts of the main body of the press. They are therefore impossible to lose and inexpensive to produce. Even without the combs, this press, owing to the design of its grate, is cheaper and simpler to manufacture and easier to clean than most other presses on the market. The robust design may be cast in metal or plastic.

Further objects and advantages will become apparent from a consideration of the drawings and ensuing description.

DRAWING FIGURES

FIG. 1 is a perspective view of a garlic press according to my invention assembled in the fully closed position.

FIG. 2 shows a perspective view of a cup used in this press, together with portions of the handles for said cup and for a ram.

FIG. 3 shows a perspective view of the ram used in the press with a partial view of the handle of the cup.

FIG. 4 shows a perspective view of the cup of such press with a partial view of the handle of the ram.

REFERENCE NUMERALS IN DRAWINGS 10 cup
12 ram
14 cup lever
16 ram lever
18 pin
20 left pin lug
22 right pin lug
24 curved tab
26 curved wall
28 grate
30 external grooves
32 internal grooves
34 perforations
36 ram wall
38 ram ridges
40 cup cleaning teeth
42 ram cleaning teeth
44 left ram support
46 right ram support.

DESCRIPTION OF PREFERRED EMBODIMENT

FIG. 1 shows a garlic press according to my invention. It comprises two parts: a receiver or cup 10 with a handle or lever 14 and a plunger or ram 12 with a handle or lever 16. The two parts are held together by a hinge formed by a tab 24 affixed to the cup and curving around a pin 18 (FIG. 2). affixed to the ram by two pin lugs 20 and 22.

The cup comprises a curved wall 26 symmetrical about the longitudinal axis of the pin. Another wall 28 connects the curved wall with the tab and serves as a grate. A series of grooves 30 cross the exterior face of grate wall 28 parallel to the pin axis. Another set of grooves 32, having the same cross section as those of grooves 30, are shown in FIG. 2 to cross the interior of grate wall 28 perpendicular to grooves 30, and deep enough to break through to them, creating thereby a set of perforations such as 34 and transforming the wall into a grate.

The ram comprises a wall 36, seen in FIG. 3, equipped with ridges 38 arranged in such a way that wall 36 can be wiped closely along wall 26 of the cup (FIG. 4) until it contacts grate 28 (FIG. 2), where its ridges press snugly into grooves 32. Supporting webs 44 and 46 connect the ram wall with the ram lever. The far end of the ram lever bears a set of teeth 40 which can precisely be mated with grooves 30 (FIG. 4) and 32 (FIG. 2). The far end of the cup lever bears a set of teeth 42 (FIG. 1) which can precisely be mated with ram ridges 38.

The cup and ram are preferably made of cast aluminum. The maximum deviation of the surfaces of the grooves is 60 degrees from each face of the grate to maximize the grate's strength and to assure clear accessibility.

OPERATION OF PREFERRED EMBODIMENT

In operation, lever 14 of the cup is held in one hand. Cloves of garlic are placed in the cup. Lever 16 of the ram is held above, and just ahead of the cup, the ram hanging down and facing back towards handle 14. The tab is hooked onto the pin and the ram and its handle swung about the pin until the ram compresses the garlic. The ram sweeps closely against the curved wall of the cup until the garlic's juice is pressed out through perforations 34.

Next, the two handles are separated by a reversal of the above action, which unlocks the hinge, freeing the ram from the cup. FIGS. 2 and 4 show how the teeth on the ram handle are then employed to scrape garlic residue from between the ridges of the cup. As shown in FIG. 2, the inside is cleaned by scooping the ram handle's teeth from the bottom of the cup to the top of the grate. As shown in FIG. 4, the outside is cleaned by scraping these same teeth across the grate from side to side. As shown in FIG. 3, any residue remaining on the ridges of the ram may similarly be scraped away from the hinge point by the teeth on the far end of the cup lever.

SUMMARY, RAMIFICATIONS AND SCOPE

Accordingly, the reader will see that my garlic press is simpler and easier to clean than any other comb-equipped "self-cleaning" garlic press. All of the surfaces of the grate are exposed for ease of inspection and cleaning. Though the forms of both the cup and ram might appear more complicated, and the number of combs is doubled in my design, the form is in fact simpler than the others: For any number of holes, my design requires cutting five times as many ridges as the square root of the number of holes, whereas other self-cleaning garlic presses require formation of the individual holes and an equal number of comb teeth: twice as many individually created forms as the number of holes. For example, in my garlic press, a screen with 25 holes requires three sets of five grooves and two combs of five grooves each, or 25 details, whereas in other designs, a 25 hole screen requires 25 individually made holes and a comb with 25 individual teeth, for a total of 50 details. My design allows for a wiping motion, which is easier and more efficient than the poking action of previous designs. The location of the combs on the two handles obviate the necessity for a multiplicity of parts which are expensive to produce and may easily be lost.

While my above description contains many specificities, these should not be construed as limitations on the scope of the invention, but rather as an exemplification of one preferred embodiment thereof. Many other variations are possible. For example, the hinge configuration may be altered: The relative positions of the pin and tab may be reversed. There may be two tabs and one pin held at the center. The ram can be supported by a single central web. The grooves may be wavy or zig-zag. One or both of the parts may be made of plastic, such as nylon or acetal, reinforced or not. The grate may be made of corrugated sheetmetal, maintaining its stiffness despite having the grooves of the corrugations punctuated by perforations formed by shallow grooves cut into the ridges on one or both sides. The hinge may be a permanent one, in which case a single unattached comb may be supplied instead of the integral combs of the preferred configuration. This comb may slide temporarily onto or into one of the other parts for storage purposes, or it may be permanently but flexibly attached to them, as by a cord.

In addition to juicing garlic, small versions of this press can be used to juice many varieties of berries. Larger versions can be used to press pomegranates, tomatoes, lemons and plums.

The crucial element of this garlic press is its grate, comprising two parallel rows of bars adjoined to form external surfaces with regular cross-sections. This may be easily fabricated from bar stock or tubing. Such linear elements may be of essentially trapezoidal, triangular, or half-round cross section. A grate of the same basic form comprises a plate, each face of which bears a parallel row of grooves, which intersect to create through holes, thus presenting a complex surface which is easily cast or machined. In a grate of the proposed design, all surfaces are exposed for easy cleaning and inspection.

This grate is further improved by the provision of a mating comb to slide along the grooves. The sliding comb can clear the grooves of an accumulation of separated debris threatening to staunch the flow of a liquid flowing through the holes, as in a storm drain. It can be employed to selectively obscure the holes preventing further flow, and can sever extrusions emanating from these holes. These last two functions could be combined in a pasta-making machine. The grate and its comb can be adapted to perform various other functions and may be made in any scale to suit different purposes:

Accordingly, the scope of the invention should be determined not by the embodiments illustrated, but by the appended claims and their legal equivalents.

I claim:

1. A press for crushing and juicing materials, such as garlic, comprising:
    (a) a cup having a bottom and an open mouth opposite said bottom, said cup forming a cavity, said open mouth being surrounded by a rim, a plurality of walls extending down from said rim to said bottom, one of said walls having a series of vertical grooves on the interior, said grooves being intersected at right angles by a series of grooves having a cross-section substantially identical to said interior grooves, but located on the exterior of said one wall such that holes are created at the points of intersection, said grooved wall extending up and away from said rim of said cup to form a curved tab, and
    (b) a ram ridged to mate conformingly with said cup cavity, said ram bearing a pin mating with said tab to form an unlockable hinge attaching said cup to said ram such that said ram can be rotated on said hinge into position within, and mated into, said cavity such that said ram substantially sweeps said cavity, or away to an unmated position such that said ram is substantially entirely outside of said cavity,
    (c) a lever affixed at one end to said ram and bearing at an opposite end a comb having teeth shaped to mate conformingly with both interior and exterior grooves of said cup,
    (d) a lever affixed at one end to said cup and bearing at an opposite end a comb having teeth shaped to mate conformingly with said ridges of said ram, whereby said ram can be rotated into said cavity to squeeze foods or other materials in said cavity, yet said cup can easily be cleaned by unlocking said hinge and unmating said ram, wiping said comb of said ram across the exterior of said one wall, and in along the interior of said cup, from said rim down to said bottom and up said one wall, and said ram can be cleaned by wiping said cup comb along said ridges from said hinge of said ram outwards.

2. A press for crushing and juicing materials, such as garlic, comprising:
    (a) a cup having a bottom and an open mouth opposite said bottom, said cup forming a cavity, said open mouth being surrounded by a rim, a plurality of walls extending down from said rim to said bottom, one of said walls having a series of vertical grooves located on the interior, said grooves being intersected by a series of grooves having identical cross-sections to said vertical grooves, but located on the exterior of said one wall and set at an angle to said vertical grooves so as to create throughholes at the points of intersection, and (b) a ram mating conformingly with said cavity, said ram being attached by a hinge to said rim above said one wall such that said ram can be rotated on said hinge into a mated position within, and mated into, said cavity such that said ram substantially sweeps said cavity, or away to an unmated position such that said ram is substantially entirely outside of said cavity, (c) a lever extending from said ram, (d) a lever extending from said cup, (e) a comb, bearing a set of teeth shaped to mate conformingly with said interior and exterior grooves of said cup, affixed to said ram lever opposite said ram such that said ram can be rotated into said cavity to squeeze foods or other materials in said cavity, yet said cup can be evacuated by unmating said ram and wiping said grooves with said comb.

3. The press of claim 2 wherein said hinge unlocks to permit complete separation of said cup from said ram.

4. The press of claim 3 wherein said unlocking hinge comprises a curved tab affixed to said rim of said cup and a pin affixed to said ram.

5. The press of claim 2 wherein said ram is ridged to mate conformingly with said interior grooves of said cup.

6. The press of claim 5 wherein said cup lever is supplied with a comb conformingly mated to said ridges of said ram and affixed to said cup lever opposite said cup.

* * * * *